United States Patent
Ishikawa et al.

(10) Patent No.: US 6,179,304 B1
(45) Date of Patent: Jan. 30, 2001

(54) AXLE PIVOT CONTROL METHOD AND APPARATUS FOR INDUSTRIAL VEHICLE

(75) Inventors: Kazuo Ishikawa; Takaki Ogawa; Masakatsu Suzuki, all of Kariya (JP)

(73) Assignee: Kabushiki Kaisha Toyoda Jidoshokki Seisakusho, Kariya (JP)

(*) Notice: Under 35 U.S.C. 154(b), the term of this patent shall be extended for 0 days.

(21) Appl. No.: 09/203,871

(22) Filed: Dec. 2, 1998

(30) Foreign Application Priority Data

Dec. 2, 1997 (JP) ................................. 9-331592

(51) Int. Cl.⁷ ............................................. B62B 5/02
(52) U.S. Cl. .................. 280/5.508; 280/754; 280/755; 280/124.111; 280/5.502; 280/5.508; 180/290
(58) Field of Search ........................ 280/754, 755, 280/124.111, 124.112, 124.113, 5.508, 5.502, 707; 180/290; 214/674

(56) References Cited

U.S. PATENT DOCUMENTS

| | | | |
|---|---|---|---|
| 3,606,365 | * | 9/1971 | Strong . |
| 3,874,539 | * | 4/1975 | Staley ..................... 214/674 |
| 3,953,040 | * | 4/1976 | Unruh et al. ................ 280/124 |
| 4,206,929 | * | 6/1980 | Melocik ..................... 180/290 |
| 4,221,530 | * | 9/1980 | Williams et al. ............. 180/290 X |
| 4,354,568 | * | 10/1982 | Griesenbrock ................ 180/290 X |
| 4,393,959 | * | 7/1983 | Acker ....................... 280/755 X |
| 5,173,857 | * | 12/1992 | Okuymama et al. ............ 280/707 X |
| 5,388,857 | * | 2/1995 | Wernimont et al. ........... 280/754 X |
| 5,630,623 | * | 5/1997 | Ganzel ...................... 280/707 X |
| 5,639,119 | * | 6/1997 | Plate et al. ................ 280/754 |
| 5,813,697 | * | 9/1998 | Bargenquast et al. .......... 280/754 |
| 5,831,343 | * | 11/1998 | Nakazaki ................... 180/290 X |

FOREIGN PATENT DOCUMENTS

| | | | |
|---|---|---|---|
| 2852600 | * | 6/1979 | (DE) ....................... 280/755 |
| 58-167216 | * | 3/1983 | (JP) . |
| 58-167215 | | 10/1983 | (JP) . |
| 0183307 | * | 10/1983 | (JP) ....................... 280/754 |
| 58-211903 | | 12/1983 | (JP) . |
| 00992273 | * | 6/1989 | (JP) ....................... 180/290 |
| 9-309309 | | 12/1997 | (JP) . |
| WO 89/05248 | * | 6/1989 | (WO) ...................... 180/290 |

* cited by examiner

Primary Examiner—Lanna Mai
Assistant Examiner—Toan To
(74) Attorney, Agent, or Firm—Morgan & Finnegan, L.L.P.

(57) ABSTRACT

An apparatus for controlling pivoting the rear axle of a forklift. The forklift includes forks, which are lifted and lowered relative to a body frame. A locking mechanism, which includes a hydraulic damper and an electromagnetic valve, locks the rear axle to stabilize the body frame. A controller controls the locking mechanism to lock the rear axle when the fork height is at least as great as a predetermined height threshold value and the weight of a load on the fork is at least as great as a predetermined weight threshold value. The controller also controls the locking mechanism to lock the rear axle when the lateral acceleration is at least as great as a predetermined threshold value. Further, the controller changes the threshold value of the lateral acceleration in accordance with the fork height.

17 Claims, 6 Drawing Sheets

AXLE PIVOT CONTROL METHOD AND APPARATUS FOR INDUSTRIAL VEHICLE

BACKGROUND OF THE INVENTION

The present invention relates to an apparatus that controls pivoting of an axle in an industrial vehicle such as a forklift. More particularly, the present invention pertains to an axle pivot control apparatus for locking an axle, which is pivotally supported by a vehicle's body frame A typical industrial vehicle such as a forklift includes a rear axle that pivots relative to the body frame. The rear axle pivots such that all the wheels always contact the ground even if the vehicle runs over bumps and dips on the road surface. This structure improves comfort, handling and stability of the vehicle.

Japanese Unexamined Patent Publication No. 58-211903 describes a forklift that has a locking mechanism for locking the rear axle against pivoting when lateral acceleration acting on the forklift exceeds a predetermined threshold value. Even if a great lateral force acts on the forklift, tilting of the forklift body frame is minimized. The forklift thus turns in a stable manner.

Japanese Unexamined Patent Publication No. 58-167215 describes a forklift that has a locking mechanism that locks the rear axle against pivoting when the weight of a load on forks and the height of the forks exceed predetermined threshold values. When the load is heavy and the forks are high, the center of gravity of the forklift is raised, which destabilizes the forklift. However, the mechanism of the publication No. 58-167215 locks the rear wheels in such cases. The forklift therefore turns or loads and unloads in a stable manner.

The mechanism according to the publication No. 58-167215 determines whether to lock the rear axle in accordance with the weight of the load on the forks and the height of the forks regardless of the magnitude of the lateral acceleration acting on the body frame. However, even if the forks remain at a certain height, changes in the lateral acceleration change the side-to-side stability of the vehicle. Therefore, the mechanism of the publication No. 58-167215 requires that the threshold value regarding the fork height be relatively small so that the side-to-side stability of the vehicle is unaffected by a great lateral acceleration. When the fork height is greater than the threshold value, the rear axle is locked even if there is little or no lateral acceleration acting on the body frame, that is, even if the vehicle would be stable without locking the rear axle.

If the functions of the mechanisms of the publications No. 58-211903 and No. 58-167215 are combined, a threshold value regarding the lateral acceleration is employed as well as the threshold values regarding the load weight and the fork height. The rear axle is locked when the lateral acceleration is greater than the threshold value and when the threshold values of the load weight and the fork height are exceeded. Such a combination allows the threshold value of the fork height to be maximized. Therefore, the rear axle is not unnecessarily locked.

However, a greater threshold value regarding the fork height requires that the threshold value of the lateral acceleration be smaller such that the vehicle is stable when turning with the forks held relatively high. When the lateral acceleration is greater than the threshold value, the rear axle is locked even if the forks are relatively low, that is, even if the vehicle would be stable without locking the rear axle. Therefore, the threshold value of the fork height cannot be increased without considering the threshold value of the lateral acceleration. As a result, combining the functions of the two publications does not eliminate unwanted locking of the rear axle.

Unnecessary locking of the rear axle is contrary to the goal of improving the comfort, stability and handling of the vehicle by allowing the rear axle to pivot. For example, the center of gravity of the forklift is relatively close to the rear wheels when there is no load on the forks. In this state, if the rear axle is locked based on the lateral acceleration, running over bumps and dips on the road surface raises one of the front wheels. If the front wheels are driving wheels, decreased ground contact pressure causes the wheel to spin. The center of gravity is relatively close to the front wheels when the forklift carries a relatively heavy load. If the rear axle is locked in this state and one of the rear wheels runs over a bump, the other rear wheel loses contact with the road surface. Since the rear wheels are steered wheels, this reduces the steering effectiveness.

If the rear axle is locked, the rear portion of the forklift is raised by a greater amount when one of the rear wheels runs over a bump compared to the case where the rear axle is not locked. Locking of the rear axle therefore may destabilize the vehicle. Further, locking the rear axle makes the body frame react to the road surface, which reduces the riding comfort of the forklift. It is therefore imperative to reduce unnecessary locking of the axle.

SUMMARY OF THE INVENTION

Accordingly, it is an objective of the present invention to provide an axle pivot control apparatus that reduces unnecessary locking of an axle.

To achieve the foregoing and other objectives and in accordance with the purpose of the present invention, an axle pivot control apparatus for an industrial vehicle having an axle pivotally supported on a frame and a carrier for carrying a load is provided. The carrier is lifted and lowered relative to the frame. The apparatus includes a locking mechanism, a detector for detecting a value indicative of the traveling state of the industrial vehicle, a locking mechanism, a height detector, a weight detector, a first controller and a second controller. The locking mechanism restricts pivoting of the axle to stabilize the frame. The height detector detects a value indicative of the height of the carrier. The weight detector detects a value indicative of the weight of a load on the carrier. The first controller controls the locking mechanism based on whether the detected height value is at least as great as a predetermined height threshold value and the detected weight value is at least as great as a predetermined weight threshold value. The second controller independently controls the locking mechanism based on whether the value indicative of the traveling state of the industrial vehicle is at least as great as a predetermined travel threshold value. The apparatus also includes a changer for changing the travel threshold value in accordance with the detected height value.

The present invention also provides an axle pivot control method for an industrial vehicle having a pivotal axle and a carrier for carrying a load. The method includes the steps of reading a value indicative of the traveling state of the vehicle, reading a value indicative of the height of the carrier, reading a value indicative of the weight of a load on the carrier, judging whether the height of the carrier is at least as great as a predetermined height threshold value based on the carrier height value, judging whether the weight of the load is at least as great as a predetermined weight threshold value based on the load weight value, restricting pivoting of the axle based on whether the detected height value exceeds a predetermined height threshold value and while the height value exceeds a predetermined weight threshold value, independently restricting pivoting of the axle based on whether the traveling state value exceeds a predetermined travel threshold value, and changing the travel threshold value in accordance with the detected height value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

FIG. 9($a$) is a map showing the relationship between the threshold value of the lateral acceleration and the fork height according to the third embodiment that is used when the load weight is less than a threshold value;

FIG. 9($b$) is a map like FIG. 9($a$) that is used when the load weight is equal to or greater than a threshold value.

DETAILED DESCRIPTION OF THE PREFERRED EMBODIMENTS

Figure 1:
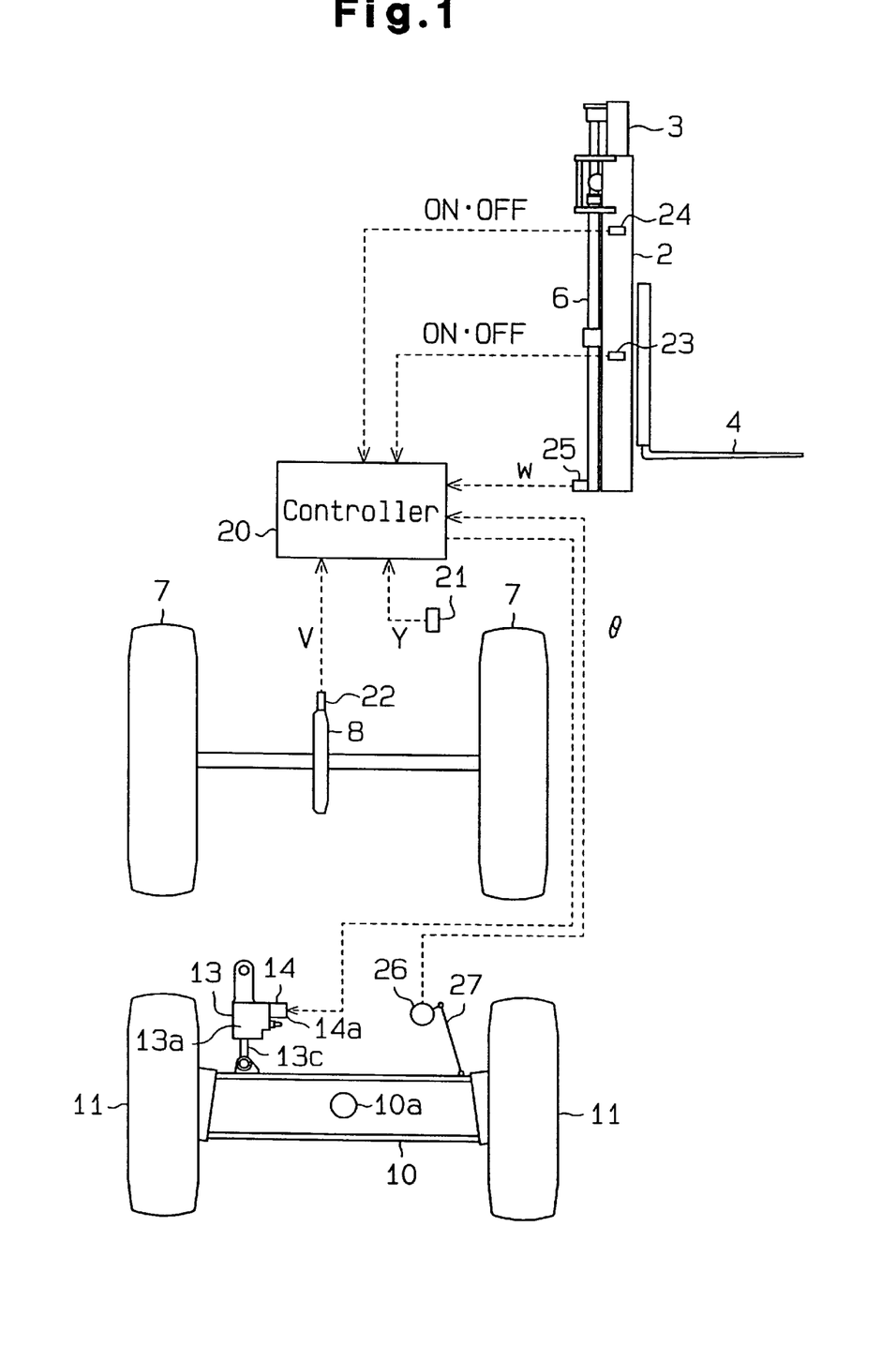
FIG. 1 is a diagrammatic view showing a pivot control apparatus of a forklift according to a first embodiment.
Figure 2:
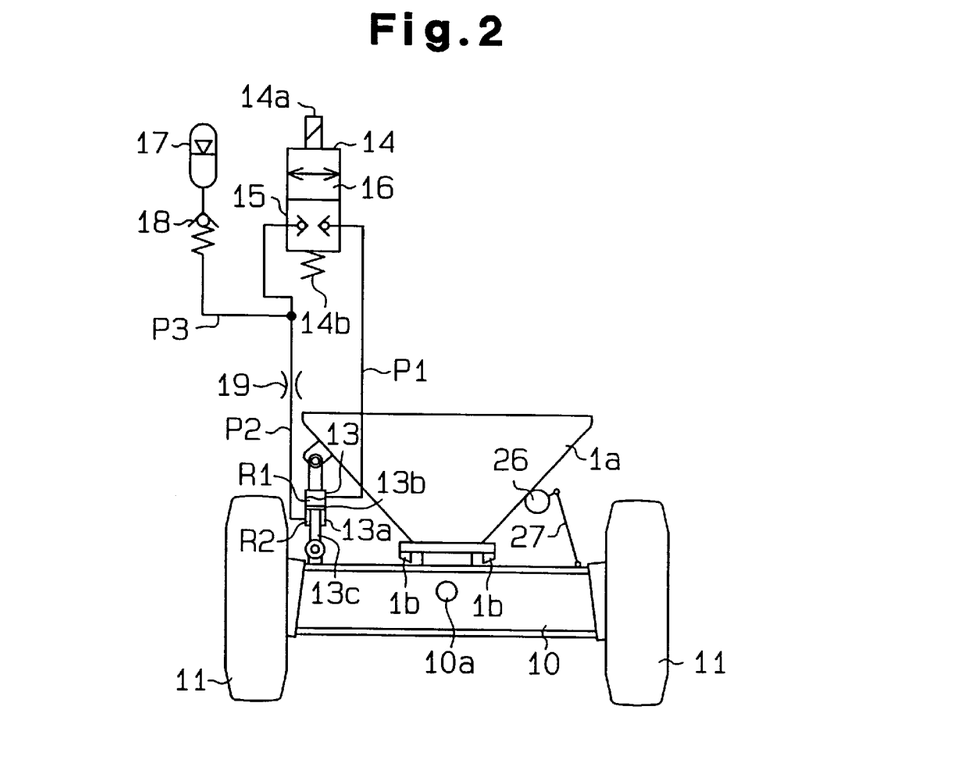
FIG. 2 is a diagrammatic view showing the body frame and the rear axle in the forklift of FIG. 1.
Figure 3:
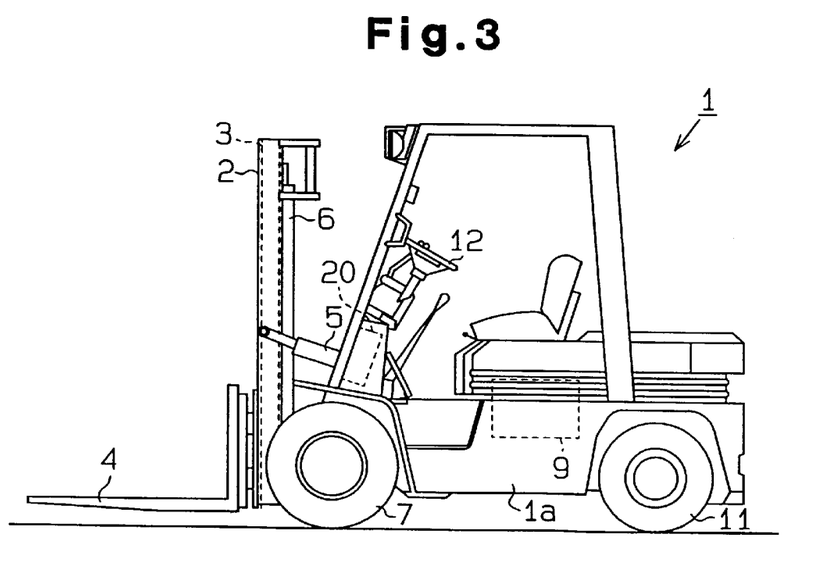
FIG. 3 is a side view showing the forklift of FIG. 1.

A forklift 1 according to a first embodiment of the present invention will now be described with reference to FIGS. 1–6. As shown in FIG. 3, the forklift 1 has driven front wheels 7 and steered rear wheels 11. A pair of outer masts 2 are arranged on the front of the forklift 1. A pair of inner masts 3 are arranged between the outer masts 2. A fork 4 is coupled to each inner mast 3 by a chain and a sprocket (neither is shown). The outer masts 2 are coupled to a body frame 1$a$ by tilt cylinders 5, which tilt the masts relative to the body frame 1$a$. A lift cylinder 6 is located on each outer mast 2. The lift cylinders 6 vertically move the inner masts 3 thereby lifting and lowering the forks 4.

Each front wheel 7 is connected to an engine 9 by a differential ring gear 8 (see FIG. 1) and a transmission (not shown). Thus, the front wheels 7 are driven by the engine 9. As shown in FIGS. 1 and 2, a rear axle 10 extends through the lower rear portion of the body frame 1$a$. The rear axle 10 is secured to the body frame 1$a$ by a center pin 10$a$ and pivots about the center pin 10$a$. The rear wheels 11, which are steered to turn the vehicle, are coupled to the ends of the rear axle 10. A steering cylinder (not shown) is located in the rear axle 10. The steering cylinder includes a pair of piston rods each coupled to one of the rear wheels 11. The steering cylinder is controlled by a steering wheel 12 shown in FIG. 3 thereby steering the rear wheels 11.

As shown in FIG. 2, a damper (hydraulic cylinder) 13 connects the rear axle 10 to the body frame 1$a$. The damper 13 includes a housing 13$a$ and a piston 13$b$ housed in the housing 13$a$. The housing 13$a$ is coupled to the body frame 1$a$, and the piston 13$b$ includes a piston rod 13$c$ extending therefrom. The distal end of the piston rod 13$c$ is coupled to the rear axle 10. The piston 13$b$ defines a first chamber R1 and a second chamber R2 in the housing 13$a$.

The damper 13 is connected to an electromagnetic valve 14 by first and second passages P1, P2. The first and second passages P1, P2 are connected with the first and second chambers R1, R2, respectively. The control valve 14 is a normally closed, two-way switch valve that has two ports. The valve 14 also includes a spool, a solenoid 14$a$ for actuating the spool and a spring 14$b$. The spool has a connection position 16 for communicating the first passage P1 with the second passage P2 and a disconnection position 15 for disconnecting the first passage P1 from the second passage P2. The second passage P2 is coupled to an accumulator 17 by a third passage P3 and a check valve 18. The accumulator 17 stores hydraulic oil and compensates for hydraulic oil leakage from the damper 13. The second passage P2 includes a throttle 19. The damper 13 and the valve 14 lock the rear axle 10.

When the solenoid 14$a$ is de-excited, the disconnection position 15 of the spool is located between the passages P1, P2 as shown in FIG. 2 thereby disconnecting the passages P1, P2 from each other. The spool thus prohibits oil flow between the chambers R1, R2. Accordingly, the damper 13 is locked. As a result, the rear axle 10 is locked to the body frame 1$a$. When the solenoid 14$a$ is excited, the connection position 16 of the spool is located between the passages P1, P2 as shown in FIG. 2 thereby connecting the passages P1, P2 with each other. The spool thus permits oil flow between the chambers R1, R2. As a result, the piston 13$b$ is movable in the housing 13$a$ and the rear axle 10 is pivotable.

Pivoting of the axle 10 is limited by a pair of stoppers 1$b$ formed on the bottom of the frame 1$a$. Specifically, the stoppers 1$b$ limit pivoting of the axle 10 within a range of ±4°. The control valve 14 is controlled by a controller 20, which is mounted on the front of the frame 1$a$ as shown in FIG. 3.

As shown in FIG. 1, the forklift 1 includes a yaw rate sensor 21, a vehicle speed sensor 22, a first fork height sensor 23, a second fork height sensor 24, a pressure sensor 25 and an axle angle sensor 26. The yaw rate sensor 21 includes, for example, a gyroscope and is located in the front portion of the body frame 1$a$ together with the controller 20. The yaw rate sensor 21 detects the yaw rate Y (rad/sec) of the body frame 1$a$. The gyroscope of the sensor 21 may be a piezoelectric type, a gas-rate type or an optical type. The vehicle speed sensor 22 detects the rotational speed of the gear 8, which is proportional to the vehicle speed V of the forklift 1.

The fork height sensors 23, 24 are located on one of the outer masts 2 at predetermined heights. The sensors 23, 24 include, for example, limit switches. The first height sensor 23 is turned off when the height of the forks 4 is smaller than two meters and is turned on when the fork height is two meters or greater. The height sensor 24 is turned off when the fork height is smaller than four meters and is turned on when the fork height is four meters or greater. Thus, the height sensors 23, 24 divide the fork height into three height ranges, or a low height range (zero to two meters), a middle height range (two to four meters) and a high height range (four meters and higher). Referring to signals from the height sensors, 23, 24, the controller 20 judges which range the forks 4 are in. The maximum height of the forks 4 is five or six meters.

The pressure sensor 25 is located at the bottom of one of the lift cylinders 6 and detects the pressure in the cylinder 6. The sensor 25 thus indirectly detects the weight W on the forks 4 based on the pressure in the lift cylinder 6, which is a function of the weight W on the forks 4.

As shown in FIGS. 1 and 2, the axle angle sensor 26 is located on a side of the body frame 1a for detecting the pivot angle (axle angle) θ of the rear axle 10. The sensor 26 includes, for example, a potentiometer and is coupled to the rear axle 10 by a link mechanism 27. The link mechanism 27 converts pivot motion of the axle 10 relative to the body frame 1a into rotational motion, and transmits the motion to the sensor 26. The axle angle θ is the angle of the rear axle 10 relative to a horizontal plane that is fixed relative to the frame 1a. The horizontal plane includes the pivot axis of the axle 10. The axle angle θ is zero degrees when the rear axle 10 is parallel to the horizontal plane of the frame 1a, and the range of the pivot angle is minus four degrees to plus four degrees ($-4° \leq \theta \leq 4°$).

Figure 4:
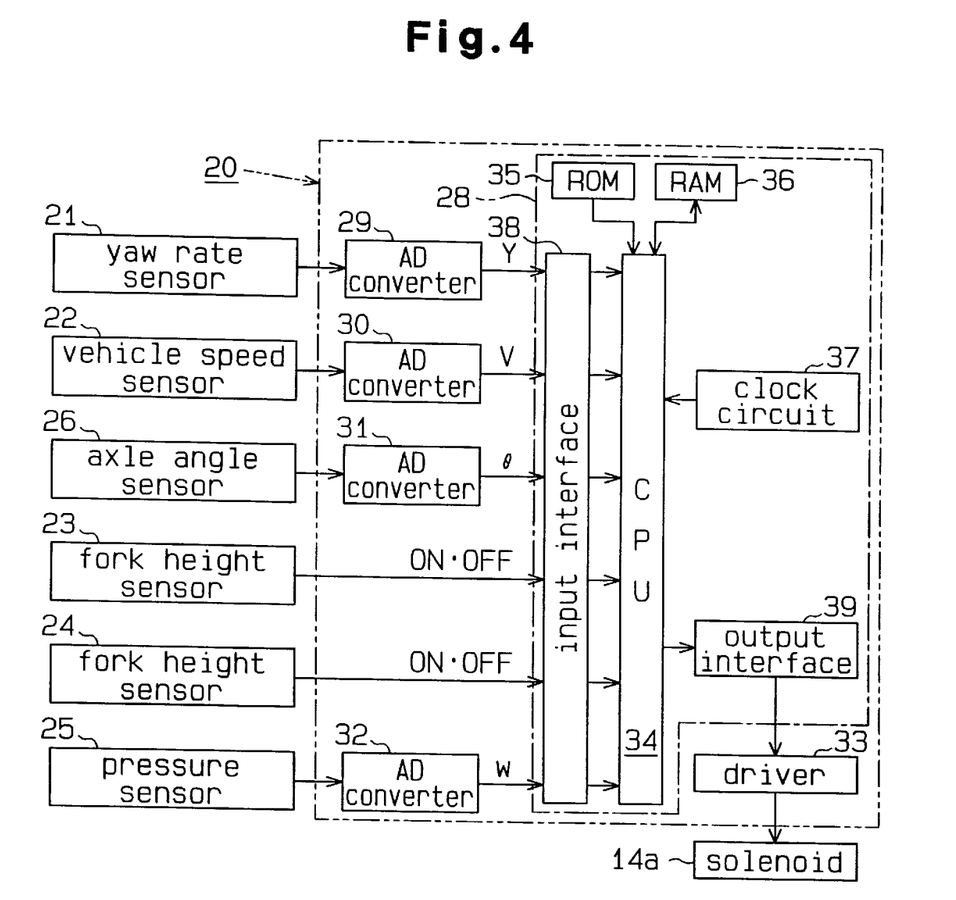
FIG. 4 is a block diagram showing the electric configuration of the pivot control apparatus of FIG. 1.

The electric configuration of the axle pivot control apparatus will now be described with reference to FIG. 4.

The controller 20 includes a microcomputer 28, analog-to-digital (A/D) converters 29–32 and a driver 33. The microcomputer 28 includes a central processing unit (CPU) 34, a read only memory (ROM) 35, a random access memory (RAM) 36, a clock circuit 37, an input interface 38 and an output interface 39.

The CPU 34 receives signals from the sensors 21, 22, 25 and 26 through the A/D converters 29–32 and ON/OFF signals from the height sensors 23, 24. The CPU 34 computes the yaw rate Y, the vehicle speed V, the weight W and the axle angle θ based on signals from the sensors 21, 22, 25, 26. Referring to the combination of ON and OFF signals from the height sensors 23, 24, the CPU 34 judges which of the low height range, middle height range or the high height range the forks 4 are in. The CPU 34 also judges whether the weight W on the forks 4 is smaller than a predetermined threshold value $W_0$.

The driver 33 does not send electric current to the solenoid when receiving an de-exciting signal (lock signal) from the CPU 34, and sends current to the solenoid 14a when receiving an exciting signal (unlock signal) from the CPU 34.

The CPU 34 executes an axle pivot control program stored in the ROM 35 at predetermined time intervals, for example, at intervals of tens of milliseconds.

During the axle pivot control, the CPU 34 computes the lateral acceleration Gs acting on the forklift 1 and the rate of change $\Delta Y/\Delta T$ of the yaw rate Y as values indicating the traveling state of the vehicle. The lateral acceleration Gs refers to a centrifugal acceleration laterally acting on the forklift 1 when the forklift 1 is turning. The rate of change $\Delta Y/\Delta T$ of the yaw rate Y, or yaw acceleration, refers to changes, over time, of the yaw rate Y. The lateral acceleration Gs is computed by multiplying the vehicle speed V by the yaw rate Y ($Gs = V \cdot Y$). When either of the values $\Delta Y/\Delta T$ and Gs exceeds a corresponding threshold value $Y_0$ and $G_0$, the CPU 34 locks the rear axle 10.

Independently of the lateral acceleration and the yaw acceleration judgements, the CPU 34 judges that a first locking condition is satisfied when the fork height is four meters or greater and the weight W on the forks 4 is equal to or greater than a threshold value $W_0$. However, even if the first locking condition is satisfied, the rear axle 10 is not locked if the absolute value of the pivot angle θ exceeds two degrees. That is, the rear axle 10 is not locked when the pivot angle θ is in one of the free regions of FIG. 6. In other words, a second locking condition is satisfied when the axle pivot angle θ is within the lock region of FIG. 6. The rear axle 10 is therefore prevented from being locked when one of the rear wheels 11 runs over a step or a bump. As long as the absolute value of the pivot angle θ is smaller than two degrees, both rear wheels 11 maintain contact with the road surface even if the rear axle 10 is locked.

Figure 5:
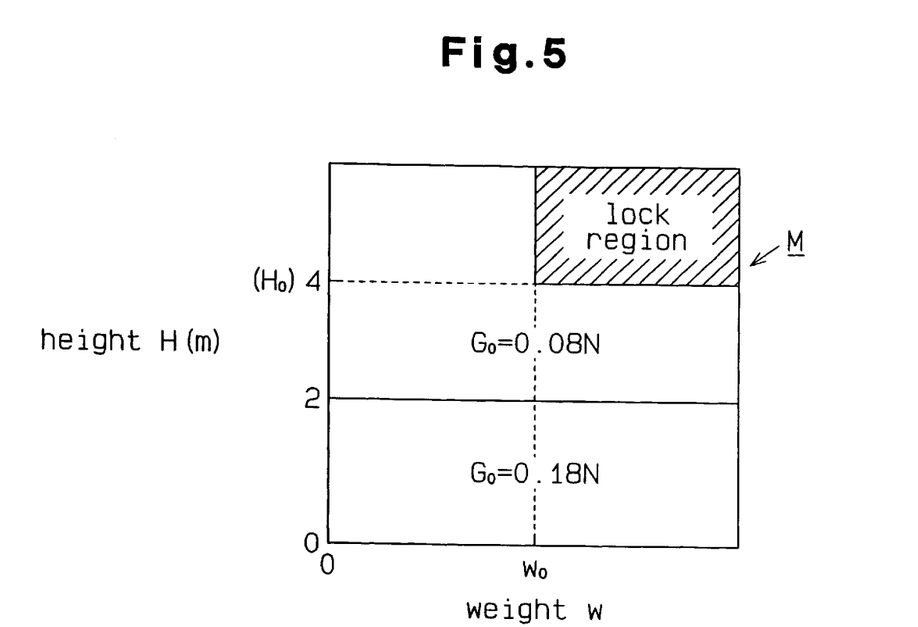
FIG. 5 is a map used in the axle pivot control procedure according to the first embodiment.
Figure 6:
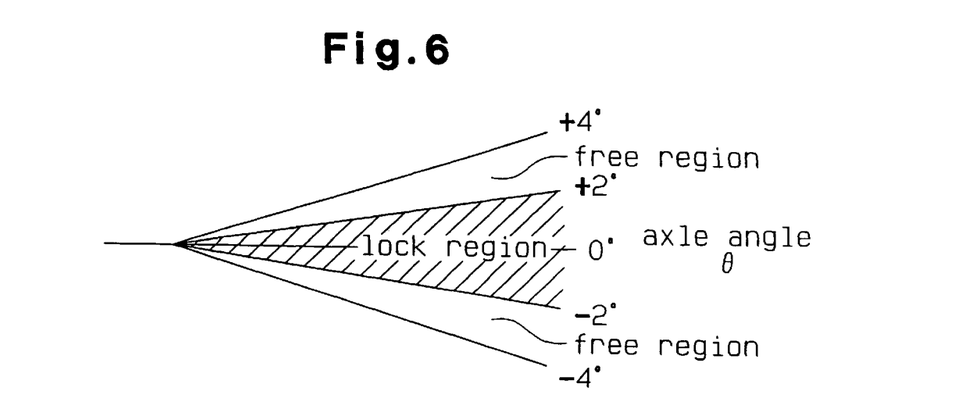
FIG. 6 is a diagram showing the relationship between the axle pivot angle and the state of the locking mechanism.

The ROM 35 previously stores a map M1 shown in FIG. 5. The CPU 34 determines whether to lock the rear axle 10 referring to the map M1. Assuming the axle pivot angle is within the lock region, the rear axle 10 is locked when the fork height H is equal to or greater than the threshold value $H_0$ (four meters) and the weight W on the forks 4 is equal to or greater than the threshold value $W_0$. Independently, the axle 10 is locked if the lateral acceleration threshold is exceeded, regardless of the axle pivot angle θ. The lateral acceleration Gs has two threshold values ($G_0$). When the fork height H is less than two meters, the threshold value $G_0$ is set, for example, at 0.18N (Newtons). When the fork height is equal to or greater than two meters, the threshold value $G_0$ is set, for example, at 0.08N. The threshold values $G_0$, $Y_0$ are determined based on road tests or are theoretically calculated such that the rear axle 10 is locked if the forklift 1 requires stabilization. The values $G_0$, $Y_0$ are changed in accordance with the type of the vehicle or the conditions in which the vehicle is used.

During operation of the forklift 1, the CPU 34 executes an axle pivot control process. The CPU 34 reads the yaw rate Y, the vehicle speed V, the fork height H, the load weight W and the axle angle θ. The CPU 34 computes the rate of change $\Delta Y/\Delta T$ of the yaw rate Y (yaw acceleration) and the lateral acceleration Gs based on the detected values Y and V.

The CPU 34 then determines whether to lock the rear axle 10 referring to the map M1 of FIG. 5. As shown in the map M1, the rear axle 10 is locked when the fork height H is greater than the threshold value (four meters) and the weight W is greater than the threshold value $W_0$ (assuming the axle pivot angle θ is within the lock region). Independently, the axle is locked if the threshold value of the lateral acceleration or the yaw acceleration is exceeded (regardless of the axle pivot angle θ). When the fork height H is low (zero to two meters), the threshold value $G_0$ of the lateral acceleration is set at 0.18N. The value $G_0$ is set at 0.08N when the fork height H is equal to or greater than two meters. The rear axle 10 is locked when the lateral acceleration Gs is greater than the threshold value (0.08N or 0.18N) or when the rate of change $\Delta Y/\Delta T$ of the yaw rate Y is greater than the threshold value $Y_0$.

The second height sensor 24 is used for determining whether the fork height H satisfies the locking condition, or whether the height H is equal to or greater than the threshold value $H_0$ (four meters). The first height sensor 23 is used for determining which of the values (0.08N or 0.18N) should be used as the threshold value $G_0$ of the lateral acceleration Gs. Since the threshold value $G_0$ is varied between two values in accordance with the fork height H, unwanted locking of the rear axle 10 is prevented during turning of the forklift 1.

If the acceleration Gs has only one threshold value $G_0$, the smaller value (0.08N) must be used so that the vehicle is stable when turning with the forks 4 at or higher than two meters. Therefore, although the vehicle would remain stable until the lateral acceleration Gs reaches 0.18N, the rear axle 10 is locked if the lateral acceleration Gs reaches 0.08N when the forks 4 are lower than two meters. In the embodiment of FIGS. 1–6, however, the threshold value $G_0$ is 0.18N when the fork height H is low (H<2 m). The rear axle 10 is therefore not unnecessarily locked due to the lateral acceleration Gs.

Changing the threshold value $G_0$ of the lateral acceleration Gs in accordance with the fork height H allows the threshold value $H_0$ of the fork height H to be maximized. When the fork height H is great, a small lateral acceleration Gs would destabilize the vehicle. However, when the fork height H is two meters or greater, the threshold value $G_0$ is set at a smaller value. Therefore, when the fork height H is great, the rear axle 10 is locked with a relatively small lateral acceleration Gs acting on the vehicle. This improves the stability of the vehicle thereby allowing the threshold value $H_0$ of the fork height 4 to be maximized. The rear axle 10 is therefore not unnecessarily locked.

As described above, the embodiment of FIGS. 1–6 prevents the rear axle 10 from being unnecessarily locked. Disadvantages caused by unnecessary locking of the rear axle 10 are reduced. As a result, the apparatus of FIGS. 1–6 improves fore-and-aft stability and comfort of the forklift 1. Further, the apparatus prevents the front wheels 7 from being raised thereby preventing the wheels of the forklift 1 from spinning.

When the absolute value of the axle angle θ is greater than two degrees, the rear axle 10 is not locked even if the fork height H is greater than the threshold value $H_0$ and the weight W on the forks 4 is greater than the threshold value $W_0$. That is, when the absolute value of the axle angle θ is greater than two degrees, one of the rear wheels 11 is very likely to be running over a bump or a step. In this state, locking the rear axle 10 causes one of the wheels 7, 11 to lose contact with the road surface when the forklift 1 moves to a flat road surface. If the absolute value of the angle θ is less than two degrees, locking of the rear axle 10 does not hinder the contact between the four wheels 7, 11 and the road surface. Further, even if the absolute value of the axle angle θ is greater than two degrees, the rear axle 10 is locked when at least one of the lateral acceleration Gs and the rate of change ΔY/ΔT of the yaw rate Y is greater than the corresponding threshold value $G_0$ and $Y_0$.

When the rear axle 10 is locked based on the lateral acceleration Gs during turning of the forklift 1, the CPU 34 stores the height H of the forks 4 in the ROM 35. That is, the CPU 34 causes the ROM 35 to memorize which of the high, middle and low height ranges the forks 4 are in when the axle 10 is locked. If the fork height H is changed during the turn, the threshold value $G_0$ of the lateral acceleration is determined based on the greater of the current fork height H and the fork height H at the time of locking the rear axle 10. For example, if the fork height H is changed from a position at or higher than two meters to a position lower than two meters during turning of the forklift 1, the threshold value is maintained at 0.08N and is not changed to 0.18N. Therefore, even if the forks 4 are lowered during turning of the forklift 1, the rear axle 10 is not unlocked due to lowering of the forks 4. The forklift 1 thus turns in a stable manner with the rear axle 10 locked.

When the forklift 1 finishes turning, the lateral acceleration Gs becomes smaller than the current threshold value $G_0$ and the rear axle 10 is unlocked. At this time, the threshold value $G_0$ is determined again based on the current fork height 4.

When the forklift 1 starts turning, the rate of change ΔY/ΔT of the yaw rate Y first exceeds the threshold value $Y_0$ and the rear axle 10 is locked, while still unpivoted, before the lateral acceleration Gs increases. If the forklift 1 changes direction, the steering wheel 12 is rotated and the lateral acceleration Gs becomes zero during the direction change. However, the value ΔY/ΔT is maintained equal to or greater than the threshold value $Y_0$ while the steering wheel 12 is being rotated. The rear axle 10 thus remains locked during the change of direction and the forklift 1 remains stable.

The height sensors 23, 24 are limit switches that divide the height H of the forks 4 into three ranges. The CPU 34 determines which range the forks 4 are in based on the combination of ON and OFF signals from the sensors 23, 24. In other words, the embodiment of FIGS. 1–6 requires only two limit switches for detecting three height ranges and thus reduces the cost of the height sensor. Further, the height sensors 23, 24, which are switching sensors, require no A/D converters.

It should be apparent to those skilled in the art that the present invention may be embodied in many other specific forms without departing from the spirit or scope of the invention. More particularly, the present invention may be modified as described below.

Figure 7:
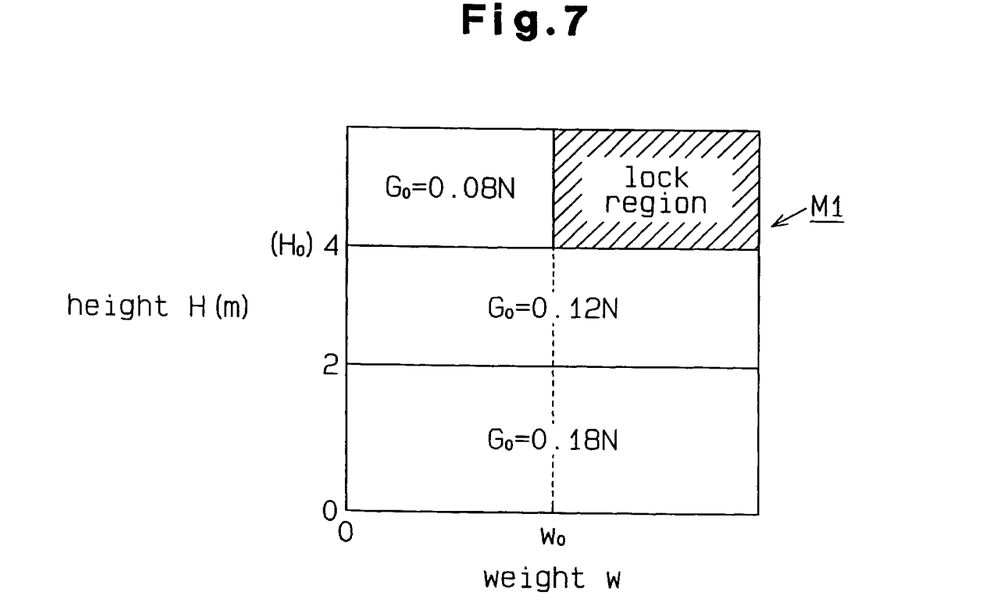
FIG. 7 is a map used in the axle pivot control procedure according to a second embodiment.

More than two values may be used for the threshold value $G_0$ of the lateral acceleration Gs. For example, as shown in FIG. 7, the threshold value $G_0$ may be 0.12N when the fork height H is two meters or greater and is smaller than four meters, and the value $G_0$ may be 0.08N when the height H is four meters or greater. The embodiment of FIG. 7 further reduces unwanted locking of the rear axle 10 when the forks 4 are in the middle height range.

Figure 8:
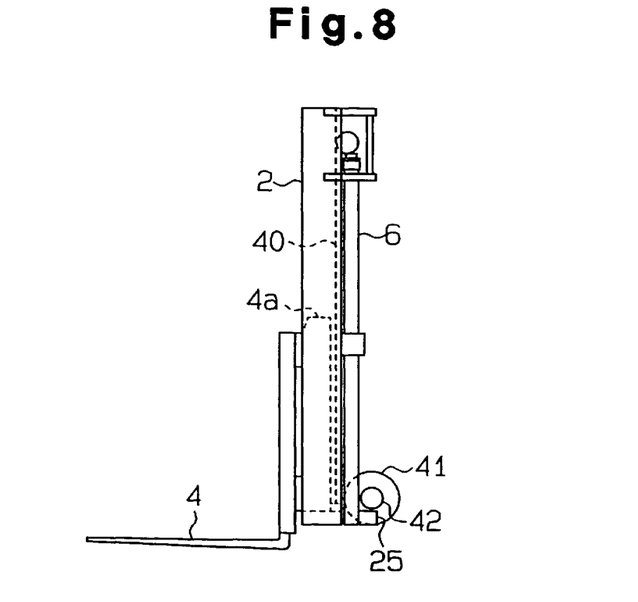
FIG. 8 is a side view showing masts having a height sensor according to a third embodiment.

The height sensors 23, 24 may be replaced with a sensor that detects continuous changes of the fork height 4, and the threshold value $G_0$ of the lateral acceleration Gs may be continuously changed in accordance with the fork height H. FIG. 8 illustrates such a height sensor 42. A wire 40 connected to a lift bracket 4*a* is wound about a reel 4. The reel 4 is urged in a direction to retract and wind the wire 40. The sensor 42 detects the rotational amount of the reel 41, which is a function of the height H of the forks 4. Further, an ultrasonic sensor may be used for detecting the fork height H. The ultrasonic sensor generates ultrasound waves from the bottom of the lift cylinder and receives ultrasound waves reflected by the piston. The sensor then detects the position of the piston by measuring the time period between the generation and the reception of the ultrasound waves.

Figure 9A:
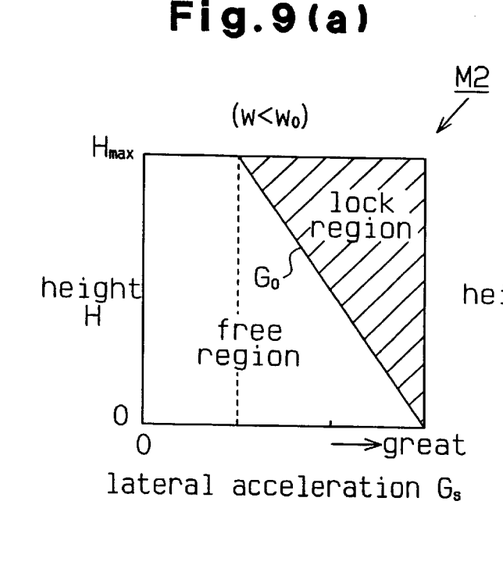
Figure 9B:
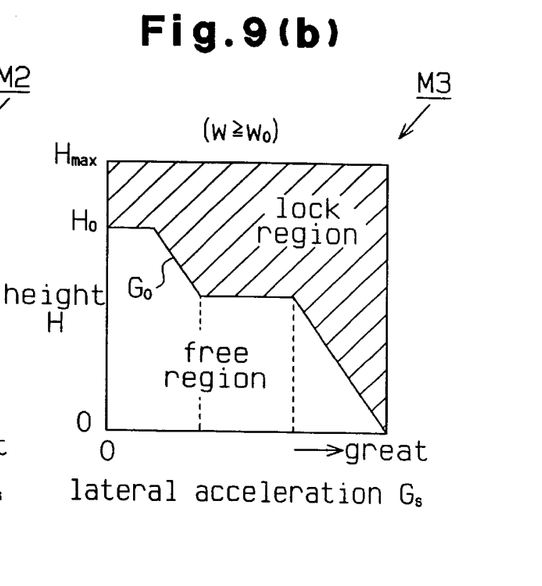

FIGS. 9(*a*) and 9(*b*) show maps M2 and M3, in which the threshold value $G_0$ of the lateral acceleration Gs is continuously changed in accordance with the fork height H. The map M2 is used when the weight W is smaller than the threshold value $W_0$, and the map M3 is used when the weight W is equal to or greater than the value $W_0$. Using the maps M2 and M3 allows the threshold value $G_0$ to be continuously changed in accordance with the fork height H thereby further reducing unwanted locking of the rear axle 10.

Figure 10:
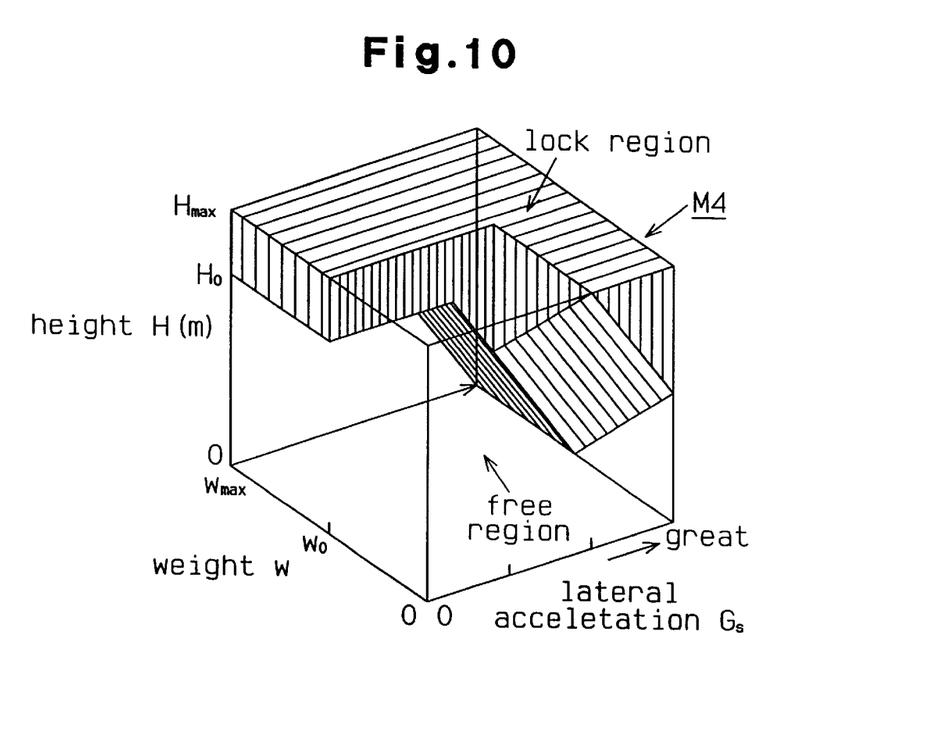
FIG. 10 is a map showing the relationship among the fork height, the load weight and the threshold value of the lateral acceleration according to a fourth embodiment.

The threshold value of the lateral acceleration Gs may be changed in accordance with both of the load weight W and the fork height H. In this case, the reel type height sensor 42 of FIG. 8 is used together with the pressure sensor 25 of FIG. 1. The height sensor may be an ultrasonic sensor that continuously detects the position of the piston in the lift cylinder 6. A map M4 of FIG. 10 shows changes of the threshold value. In the map M4, the threshold value continuously changes in accordance with the load weight W and the fork height H. The threshold value of the lateral acceleration Gs is represented by the border between the free region and the lock region of the map M4. The map M4 substantially eliminates unwanted locking of the rear axle 10 when the forklift 1 is moving.

The height sensor may include three or more limit switches, and the threshold value of the lateral acceleration Gs may have two or more values. This reduces unwanted locking of the rear axle 10 when the forklift 1 is traveling. The number of the limit switches is preferably three or less to reduce cost.

The axle angle sensor 26 may be omitted. In this case, the rear axle 10 is locked regardless of the current axle angle θ when the fork height H is greater than the threshold value $H_0$ and the load weight W is greater than the threshold value $W_0$.

Locking mechanisms other than the damper 13 may be employed for locking the rear axle 10. For example, the mechanism described in Japanese Unexamined Patent Publication No. 58-167215, which locks an axle by inserting two blocks between a body frame and the axle, may be used. Further, the rear axle 10 need not be rigidly locked. Instead, the pivoting range of the axle 10 may be limited to narrow range when locked.

Sensors for detecting the traveling state of the forklift 1 are not limited to the yaw rate sensor 21 and vehicle speed sensor 22. Any sensors may be used as long as the sensors obtain necessary values for computing the lateral acceleration Gs and the rate of change $\Delta Y/\Delta T$ of the yaw rate Y. For example, the yaw rate sensor 21 may be replaced with a steer angle sensor that detects wheel angle of the rear wheels 11. In this case, the wheel angle and the vehicle speed V are used for computing the lateral acceleration Gs (V2/r) and the rate of change $\Delta Y/\Delta T$ of the yaw rate Y (V·Δ(1/r)/ΔT), wherein "r" is a turn radius judged based on the wheel angle. Also, a combination of an acceleration sensor and the yaw rate sensor 21 may be used for computing the values Gs and $\Delta Y/\Delta T$.

The traveling state of the forklift 1 may be judged based only on the lateral acceleration Gs. The rate of change $\Delta Y/\Delta T$ of the yaw rate Y is not necessarily required. Further, the rate of change $\Delta Gs/\Delta T$ of the lateral acceleration Gs may be used instead of the rate of change $\Delta Y/\Delta T$ of the yaw rate Y The present invention may be applied to industrial vehicles other than the forklift 1. Specifically, the present invention may be applied to, for example, shovel loaders and vehicles for high lift work.

Therefore, the present examples and embodiments are to be considered as illustrative and not restrictive and the invention is not to be limited to the details given herein, but may be modified within the scope and equivalence of the appended claims.

What is claimed is:

1. An axle pivot control apparatus for an industrial vehicle having an axle pivotally supported on a frame and a carrier for carrying a load, wherein the carrier is lifted and lowered relative to the frame, the apparatus comprising:

a locking mechanism for restricting pivoting of the axle to stabilize the frame;

a detector for detecting a value indicative of a traveling state of the industrial vehicle;

a height detector for detecting a value indicative of the height of the carrier;

a weight detector for detecting a value indicative of the weight of a load on the carrier, the height detector comprising a plurality of switch type sensors that are switched on and off when the carrier is at certain heights, wherein the certain heights include a height corresponding to a predetermined height threshold value and a height that is used for determining when to change a travel threshold value;

a controller for controlling the locking mechanism based on whether the value indicative of the height is at least as great as the predetermined height threshold value and whether the value indicative of the weight is at least as great as a predetermined weight threshold value, wherein the controller independently controls the locking mechanism based on whether the value indicative of the traveling state of the industrial vehicle is at least as great as a predetermined travel threshold value; and a changer for changing the travel threshold value in accordance with the value indicative of the height.

2. An axle pivot control apparatus for an industrial vehicle having an axle pivotally supported on a frame and a carrier for carrying a load, wherein the carrier is lifted and lowered relative to the frame, the apparatus comprising:

a locking mechanism for restricting pivoting of the axle to stabilize the frame;

a detector for detecting a value indicative of a traveling state of the industrial vehicle;

a height detector for detecting a value indicative of the height of the carrier, wherein the height detector continuously detects the value indicative of the height;

a weight detector for detecting a value indicative of the weight of a load on the carrier;

a controller for controlling the locking mechanism based on whether the value indicative of the height is at least as great as a predetermined height threshold value and whether the value indicative of the weight is at least as great as a predetermined weight threshold value, wherein the controller independently controls the locking mechanism based on whether the value indicative of the traveling state of the industrial vehicle is at least as great as a predetermined travel threshold value; and a changer for changing the travel threshold value in accordance with the value indicative of the height, wherein the changer continuously changes the travel threshold value in accordance with the value indicative of the height.

3. The apparatus according to claim 2, wherein the changer includes a memory that stores two different maps, each defining a relationship between the travel threshold value and the carrier height, wherein the changer determines the travel threshold value using one of the maps when the weight of the load on the carrier is judged to be smaller than a predetermined reference value, and wherein the changer determines the travel threshold value using the other map when the value indicative of the weight is at least equal to the predetermined reference value.

4. The apparatus according to claim 1, wherein the changer changes the travel threshold value in accordance with the value indicative of the weight and with the value indicative of the height.

5. The apparatus according to claim 1, wherein the value indicative of the traveling state of the industrial vehicle is indicative of the lateral acceleration acting on the frame.

6. The apparatus according to claim 1, wherein, when a pivot angle of the axle is greater than a predetermined value, the controller controls the locking mechanism to permit pivoting of the axle regardless of the value indicative of the height and the value indicative of the weight.

7. The apparatus according claim 1, wherein the industrial vehicle is a forklift.

8. An axle pivot control apparatus for a forklift having an axle pivotally supported on a frame and a fork for carrying a load, wherein the fork is lifted and lowered relative to the frame, the apparatus comprising:
- a locking mechanism for restricting pivoting of the axle to stabilize the frame;
- a lateral acceleration detector for detecting a value indicative of the lateral acceleration acting on the forklift;
- a height detector for detecting a value indicative of the height of the fork, the height detector comprises a plurality of switch type sensors that are switched on and off when the fork is at certain heights, wherein the certain heights include a height corresponding to a predetermined height threshold value and a height that is used for determining when to change a threshold value of the lateral acceleration;
- a weight detector for detecting a value indicative of the weight of a load on the fork;
- a controller for controlling the locking mechanism to restrict pivoting of the axle when the value indicative of the height is at least as great as a predetermined height threshold value and the value indicative of the weight is at least as great as a predetermined weight threshold value, wherein the controller controls the locking mechanism to restrict pivoting of the axle when the value indicative of the lateral acceleration is at least as great as a predetermined threshold value; and
- a changer for changing the threshold value of the lateral acceleration in accordance with the value indicative of the height.

9. An axle pivot control apparatus for a forklift having an axle pivotally supported on a frame and a fork for carrying a load, wherein the fork is lifted and lowered relative to the frame, the apparatus comprising:
- a locking mechanism for restricting pivoting of the axle to stabilize the frame;
- a lateral acceleration detector for detecting a value indicative of the lateral acceleration acting on the forklift;
- a height detector for detecting a value indicative of the height of the fork, wherein the height detector continuously detects the value indicative of the height;
- a weight detector for detecting a value indicative of the weight of a load on the fork;
- a controller for controlling the locking mechanism to restrict pivoting of the axle when the value indicative of the height is at least as great as a predetermined height threshold value and the value indicative of the weight is at least as great as a predetermined weight threshold value, wherein the controller controls the locking mechanism to restrict pivoting of the axle when the value indicative of the lateral acceleration is at least as great as a predetermined threshold value; and
- a changer for changing the threshold value of the lateral acceleration in accordance with the value indicative of the height, wherein the changer continuously changes the threshold value of the lateral acceleration in accordance with the value indicative of the height.

10. The apparatus according to claim 9, wherein the changer includes a memory that stores two different maps, each defining a relationship between the threshold value of the lateral acceleration and the value indicative of the height, wherein the changer determines the threshold value of the lateral acceleration using one of the maps when the weight of the load on the fork is judged to be smaller than a predetermined reference value, and wherein the changer determines the threshold value of the lateral acceleration using the other map when the value indicative of the weight is at least equal to the predetermined reference value.

11. The apparatus according to claim 8, wherein the changer changes the threshold value of the lateral acceleration in accordance with the value indicative of the weight and with the value indicative of the height.

12. The apparatus according to claim 8, wherein, when a pivot angle of the axle is greater than a predetermined value, the controller controls the locking mechanism to permit pivoting of the axle regardless of the value indicative of the height and the value indicative of the weight.

13. An axle pivot control method for an industrial vehicle having a pivotal axle and a carrier for carrying a load, the method comprising:
- reading a value indicative of the traveling state of the vehicle;
- reading a value indicative of the height of the carrier;
- reading a value indicative of the weight of a load on the carrier;
- judging whether the height of the carrier is at least as great as a predetermined height threshold value based on the value indicative of the height;
- judging whether the weight of the load is at least as great as a predetermined weight threshold value based on the value indicative of the weight;
- restricting pivoting of the axle based on whether the value indicative of the height exceeds a predetermined height threshold value while the value indicative of the weight exceeds a predetermined weight threshold value;
- independently restricting pivoting of the axle based on whether the value indicative of the traveling state exceeds a predetermined travel threshold value; and
- changing the travel threshold value in accordance with the value indicative of the height.

14. The method according to claim 13 including:
continuously detecting the height of the carrier; and
continuously changing the travel threshold value in accordance with the value indicative of the height.

15. The method of claim 13 including:
- judging whether the weight of the load is in a first range or a second range;
- determining the travel threshold value using a first map when the weight of the load is judged to be in the first range and determining the travel threshold value using a second map when the weight of the load is judged to be in the second range.

16. The method of claim 13 including:
- detecting a value indicative of the pivot angle of the pivotal axle;
- permitting unrestricted pivoting of the pivotal axle when the value indicative of the pivot angle exceeds a predetermined value regardless of the value indicative of the height and the value indicative of the weight.

17. The method according to claim 13 including:
- detecting a change in the carrier height when pivoting of the axle is restricted; and
- determining the travel threshold value based on the greater of the value indicative of the height when pivoting of the axle was restricted and the current value indicative of the height.

* * * * *

UNITED STATES PATENT AND TRADEMARK OFFICE
CERTIFICATE OF CORRECTION

PATENT NO. : 6,179,304 B1
DATED : January 30, 2001
INVENTOR(S) : Kazuo Ishikawa et al.

Page 1 of 1

It is certified that error appears in the above-identified patent and that said Letters Patent is hereby corrected as shown below:

<u>Title page,</u>
Item [56] References Cited, please change "4,206,929" to -- 4,206,829 --;

Signed and Sealed this

Twenty-eighth Day of May, 2002

*Attest:*

JAMES E. ROGAN
*Attesting Officer*     *Director of the United States Patent and Trademark Office*